United States Patent
Suzuki (10) Patent No.: US 8,620,390 B2
(45) Date of Patent: *Dec. 31, 2013

(54) MAIL HANDLING APPARATUS AND METHOD FOR HANDLING E-MAIL

(75) Inventor: Hideaki Suzuki, Nagoya (JP)

(73) Assignee: Denso Corporation, Kariya (JP)

( * ) Notice: Subject to any disclaimer, the term of this patent is extended or adjusted under 35 U.S.C. 154(b) by 306 days.

This patent is subject to a terminal disclaimer.

(21) Appl. No.: 12/661,809

(22) Filed: Mar. 24, 2010

(65) Prior Publication Data

US 2010/0248694 A1  Sep. 30, 2010

(30) Foreign Application Priority Data

Mar. 26, 2009 (JP) ................. 2009-076307

(51) Int. Cl.
- *H04M 1/00* (2006.01)
- *H04M 11/00* (2006.01)
- *H04B 1/034* (2006.01)
- *H04B 1/18* (2006.01)
- *H04B 1/06* (2006.01)
- *H04B 1/10* (2006.01)
- *H04B 7/00* (2006.01)
- *H05K 11/02* (2006.01)
- *H04W 24/00* (2009.01)
- *G06F 15/16* (2006.01)

(52) U.S. Cl.
USPC ........... 455/569.2; 455/41.2; 455/96; 455/99; 455/152.1; 455/238.1; 455/297; 455/456.6; 455/569.1; 455/575.9; 379/93.05; 379/93.24; 709/206

(58) Field of Classification Search
USPC ........ 455/41.1, 41.2, 41.3, 412.1, 413, 414.1, 455/569.1, 552.1, 553.1, 426.1, 569.2, 570, 455/575.9, 96, 99, 152.1, 238.1, 297, 345, 455/189; 701/117; 705/209, 402, 406, 204, 705/205, 206, 245, 207, 201; 707/600, 607; 709/204, 205, 206, 245, 207, 201; 379/93.01, 93.24
See application file for complete search history.

(56) References Cited

U.S. PATENT DOCUMENTS 7,139,529 B2  11/2006  Rekimoto et al.
7,433,651 B2  10/2008  Rekimoto et al.

(Continued)

FOREIGN PATENT DOCUMENTS

| JP | 10-224859 | 8/1998 |
|----|-----------|--------|
| JP | 2002-204239 | 7/2002 |

(Continued)

OTHER PUBLICATIONS

Office action dated Feb. 22, 2011 in corresponding Japanese Application No. 2009-076307.

(Continued)

*Primary Examiner* — Inder Mehra
(74) *Attorney, Agent, or Firm* — Harness, Dickey & Pierce, PLC (57) ABSTRACT

An in-vehicle hands-free apparatus transfers, from a cellular phone to the hands-free apparatus, information regarding all the e-mails received from a communication network and stored in the cellular phone, right after the connection of a Bluetooth (BT) communication channel between the cellular phone and the hands-free apparatus. Thus, received e-mails that are received by the cellular phone from the communication network during a BT communication channel disconnection time can be synchronized between the cellular phone and the in-vehicle hands-free apparatus, thereby allowing the user to handle, on the hands-free apparatus, the received e-mails that have been received by the cellular phone while the BT communication channel is absent between the cellular phone and the hands-free apparatus.

24 Claims, 5 Drawing Sheets

(56) References Cited

U.S. PATENT DOCUMENTS

| | | |
|---|---|---|
| 7,848,705 B2 | 12/2010 | Rekimoto et al. |
| 7,970,436 B1 * | 6/2011 | Katzer et al. ............. 455/557 |
| 8,175,531 B2 | 5/2012 | Rekimoto et al. |
| 8,185,053 B2 | 5/2012 | Rekimoto et al. |
| 2007/0117541 A1 * | 5/2007 | Helferich ............. 455/412.1 |
| 2008/0294729 A1 * | 11/2008 | Ionescu et al. ............. 709/206 |
| 2009/0233628 A1 * | 9/2009 | Vendel ............. 455/456.6 |
| 2010/0169432 A1 * | 7/2010 | Santori et al. ............. 709/206 |
| 2010/0248693 A1 * | 9/2010 | Suzuki ............. 455/412.1 |
| 2012/0238246 A1 * | 9/2012 | Rekimoto et al. ............. 455/411 |

FOREIGN PATENT DOCUMENTS

| | | |
|---|---|---|
| JP | 2003-256341 | 9/2003 |
| JP | 2004-179707 | 6/2004 |
| JP | 2005-198095 | 7/2005 |
| JP | 2008-310583 | 12/2008 |

OTHER PUBLICATIONS

Office Action issued Oct. 23, 2012 in corresponding Japanese Application No. 2011-180479, a divisional application from 2009-76307, with English translation.

* cited by examiner

| PHONE NAME | RECEIVED MAIL INFO |
|---|---|
| PHONE A | 1 (DATE, SENDER, TITLE, TEXT) |
| | 2 (DATE, SENDER, TITLE, TEXT) |
| | 3 (DATE, SENDER, TITLE, TEXT) |
| | ⋮ |
| | na (DATE, SENDER, TITLE, TEXT) |
| PHONE B | 1 (DATE, SENDER, TITLE, TEXT) |
| | 2 (DATE, SENDER, TITLE, TEXT) |
| | 3 (DATE, SENDER, TITLE, TEXT) |
| | ⋮ |
| | nb (DATE, SENDER, TITLE, TEXT) |
| ⋮ | ⋮ |
| PHONE N | 1 (DATE, SENDER, TITLE, TEXT) |
| | 2 (DATE, SENDER, TITLE, TEXT) |
| | 3 (DATE, SENDER, TITLE, TEXT) |
| | ⋮ |
| | nn (DATE, SENDER, TITLE, TEXT) |

MAIL HANDLING APPARATUS AND METHOD FOR HANDLING E-MAIL

CROSS REFERENCE TO RELATED APPLICATION

The present application is based on and claims the benefit of priority of Japanese Patent Application No. 2009-76307, filed on Mar. 26, 2009, the disclosure of which is incorporated herein by reference.

FIELD OF THE INVENTION

The present invention generally relates to a mail handling apparatus that receives an e-mail from a cellular phone.

BACKGROUND INFORMATION

Conventionally, the cellular phone transfers an e-mail to an in-vehicle apparatus when (a) the cellular phone and the in-vehicle apparatus are connected through a Bluetooth (BT) communication function, (b) the cellular phone is brought into a vehicle compartment, and (c) the cellular phone receives the e-mail from a communication network. Such an operation scheme is disclosed, for example, in a Japanese patent document 1. More practically, the cellular phone transfers, to the in-vehicle apparatus, mail information such as an e-mail reception date and time, a sender of the e-mail, a title of the e-mail, e-mail text (i.e., e-mail contents) and the like.

(Japanese patent document 1) JP-A-2003-256341

By the configuration described in the above patent document 1, the in-vehicle apparatus and the cellular phone are always in synchronization with each other, in terms of received e-mails in the cellular phone, as long as (a) the BT communication channel therebetween is in an established condition and (b) the e-mail is received from the network while the BT communication channel is in the established condition. In other words, the storage contents regarding the e-mail are made to be same in the cellular phone and in the in-vehicle apparatus. As a result, the user can handle the mail information on the in-vehicle apparatus if the e-mail is received from the network by the cellular phone while the BT communication channel is in the established condition. That is, the user can display text of the e-mail, and/or can display the e-mail titles in a list form.

However, according to the patent document 1, the e-mail received by the cellular phone during a non-connection period of the BT communication channel cannot be synchronized with the in-vehicle apparatus, thereby making it impossible for the user to use the in-vehicle apparatus for handling the mail information of the e-mail that is received by the cellular phone while the BT communication channel between the cellular phone and the in-vehicle apparatus is in the non-established condition.

SUMMARY OF THE INVENTION

In view of the above and other problems, the present invention provides a mail handling apparatus that allows the user to handle information of an e-mail that is exchanged with the communication network by a cellular phone while a short range wireless communication between the cellular phone and the mail handling apparatus is in a non-established condition.

In an aspect of the present disclosure, the mail handling apparatus includes: a connection unit for connecting a short range wireless communication channel to a cellular phone that stores mail information of an e-mail exchanged with a communication network; a mail information reception unit for receiving the mail information from the cellular phone on a condition that the short range wireless communication channel is being connected between the connection unit and the cellular phone; a mail information storage unit for storing the mail information received from the cellular phone that is connected to the connection unit through the short range wireless communication channel; an operation reception unit for receiving a user operation regarding the mail information in the mail information storage unit; and a control unit for processing the stored mail information in the mail information storage unit according to the user operation received by the operation reception unit.

The control unit controls, at a time of connection of the connection unit to the cellular phone through the short range wireless communication channel, the mail reception unit to receive the mail information, which includes the mail information of the mail that is exchanged by the cellular phone with the communication network while the cellular phone is not connected to the connection unit through the short range wireless communication channel, and controls the mail information storage unit to store the mail information received by the mail information reception unit. As a result, the user can handle, on the mail handling apparatus, the mail information of the e-mail that is exchanged with the communication network by the cellular phone during a disconnection time of the short range wireless communication channel. Thus, the user's convenience regarding the mail handling is improved.

Further, a method for handling e-mails by the mail handling apparatus can be defined substantially in the same manner. That is, the e-mail received by the cellular phone at a time of lack of the wireless communication channel between the cellular phone and the mail handling apparatus is transferred from the cellular phone to the mail handling apparatus by: connecting a short range wireless communication channel to a cellular phone that stores mail information of an e-mail exchanged with a communication network; receiving the mail information from the cellular phone on a condition that the short range wireless communication channel is being connected between the mail handling apparatus and the cellular phone; storing the mail information received from the cellular phone that is connected to the mail handling apparatus through the short range wireless communication channel; receiving a user operation regarding the stored mail information; and processing the stored mail information according to the user operation. The mail information is received, for storage in the mail handling apparatus, by a connection to the cellular phone through the short range wireless communication channel, which includes the mail information of e-mails that are exchanged by the cellular phone with the communication network while the cellular phone is not connected to the mail handling apparatus through the short range wireless communication channel. As a result, the user can handle, on the mail handling apparatus, the mail information of the e-mail that is exchanged with the communication network by the cellular phone during a disconnection time of the short range wireless communication channel, thereby having an improved ease of mail handling on the mail handling apparatus.

BRIEF DESCRIPTION OF THE DRAWINGS

Objects, features, and advantages of the present disclosure will become more apparent from the following detailed description made with reference to the accompanying drawings, in which.

DETAILED DESCRIPTION

In an embodiment of the present invention, a mail handling apparatus having a short range wireless communication function, implemented as a vehicular hands-free apparatus capable of Bluetooth (registered trademark: abbreviated as "BT" in the following) communication function, is described with reference to the drawing. The following description is regarding a situation that a BT enabled cellular phone is brought into a vehicle compartment, and is in a BT communication enabled condition with the hands-free apparatus.

Figure 1:
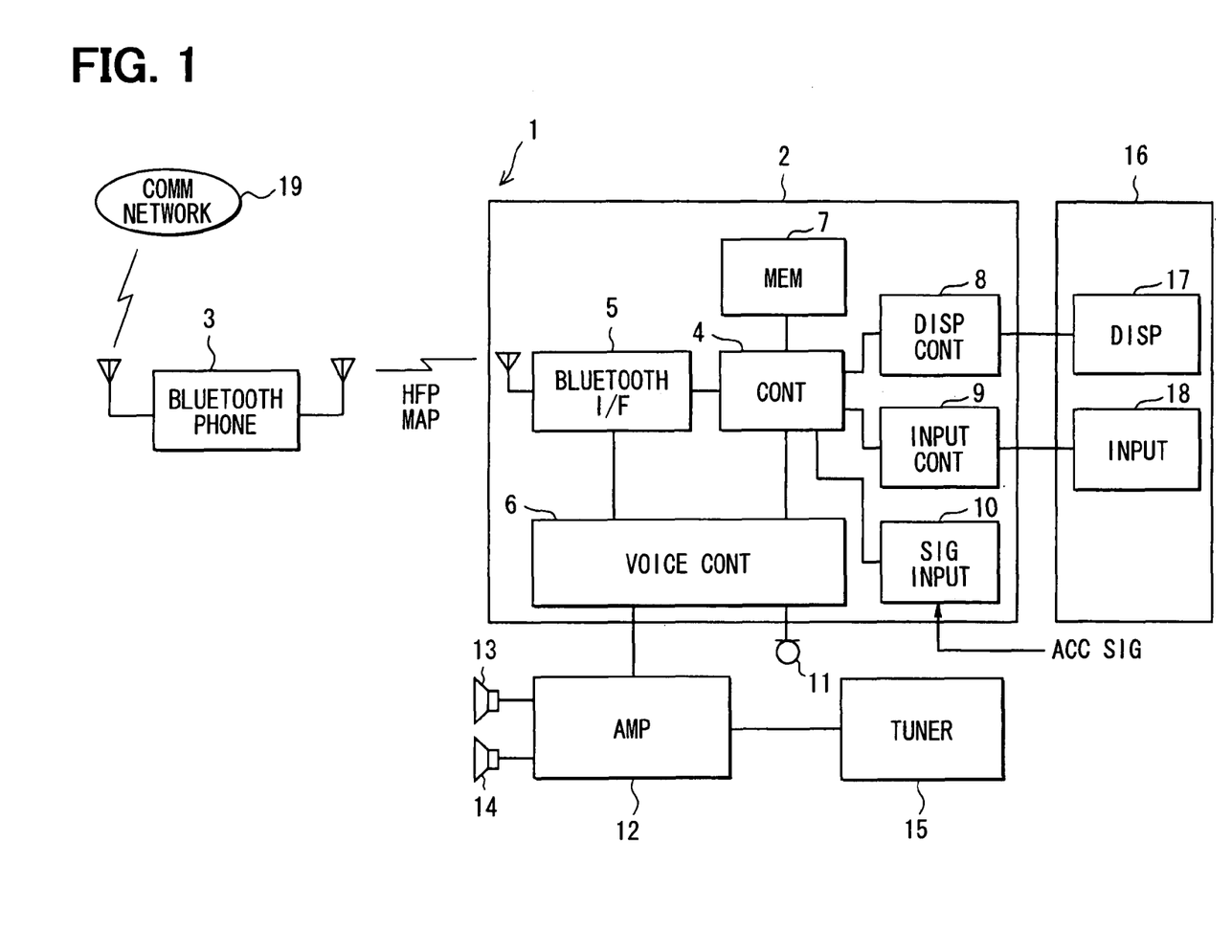
FIG. 1 is a block diagram of a configuration of a hands-free system in an embodiment of the present invention.

An in-vehicle hands-free system 1 consists of an in-vehicle hands-free apparatus 2 and a cellular phone 3. The in-vehicle hands-free apparatus 2 includes a control unit 4 (an operation reception unit and a control unit in claims), a BT interface (IF) unit 5 (a connection unit and a mail information reception unit in claims), a voice control unit 6, a memory unit 7 (a mail information storage unit in claims), a display control unit 8, an input control unit 9, and a signal input unit 10.

The control unit 4 consisting of a well-known microcomputer that has a CPU, a RAM, a ROM, an input/output bus, and the like, and controls the entire operation such as a communication operation, an information management operation and the other operations of the in-vehicle hands-free apparatus 2. The BT interface unit 5 has a function to perform BT communication to the cellular phone 3, and is capable of establishing simultaneous multiple connections of two profiles of BT standards to the cellular phone 3, that is, a hands-free profile (HFP) for a hands-free call and a message access profile (MAP) for mail information transfer regarding an e-mail, when the interface unit 5 and the cellular phone 3 are in a BT communication channel (i.e., short range wireless communication channel in claims) connected condition.

The e-mail mentioned above is a general term representing text message, image information and the like exchanged through a well-known computer network. In addition, the BT interface unit 5 is configured to be capable of connecting a phone book access profile (PBAP) for a transfer of telephone book information and inbound/outbound call history information and an object push profile (OPP) for a transfer of various information besides the above-mentioned HFP and MAP. These profiles are the communication protocols defined for respective functions.

The voice control unit 6 is, for example, connected to a microphone 11 disposed at a position for collecting user's voice such as a steering wheel or the like, and is also connected to an audio amplifier 12 disposed outside of the in-vehicle hands-free apparatus 2. The audio amplifier 12 is connected to two speakers 13, 14. The speaker 13 is, for example, arranged on a driver's door, and the speaker 14 is arranged on a navigator's door. Further, the audio amplifier 12 is connected to a tuner deck 15, for having an input of music retrieved from a record medium or a radio program received from a radio station. The audio amplifier 12 amplifies the input of those music data and/or radio program to output to the speakers 13, 14.

The memory unit 7 is configured to be capable of storing various information. The memory unit 7 has, for each of the multiple cellular phones 3, a received mail storage area for storing received mail information of received mails that is received from a communication network 19 by one of the cellular phones 3, and a transmitted mail storage area for storing transmitted mail information of transmitted mails that are transmitted to the communication network 19 from one of the cellular phones 3.

Figure 2:
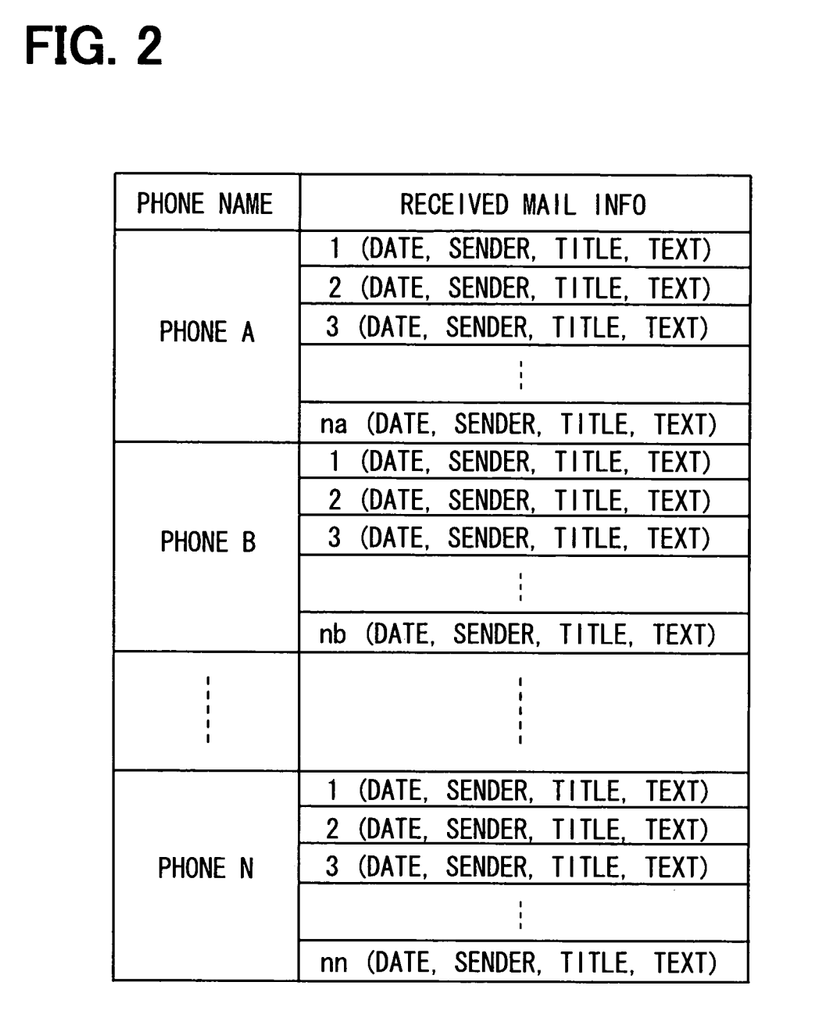
FIG. 2 is an illustration of a mail information storage area in the hands-free system.

The received mail storage area has, as shown in FIG. 2, multiple sections respectively allocated for each of the multiple cellular phones 3 that connects the BT communication channel to the BT interface unit 5. The received mail information stored therein includes a reception date and time, a sender, a title, text of each mail that is received by one of the of the cellular phones 3 from the communication network 19. Further, the maximum storable number of entries of the received mail information is defined as "na" for a cellular phone A, "nb" for a cellular phone B, and "nn" for a cellular phone N. The maximum number of entries in each of the cellular phones 3 may be a fixed value, or a variable value. Further, the maximum number may be the same number as the maximum number of entries of the corresponding cellular phone 3 that is defined in a specification of that cellular phone 3.

Though the transmitted mail storage area is not illustrated in the drawing, the area is allocated for each of the cellular phones 3 in the same manner as the received mail storage area. That is, each of the cellular phones 3 has an individual transmitted mail storage area. The transmitted mail information includes a transmission date and time, a destination, a title, text of each mail that is transferred by one of the of the cellular phones 3 to the communication network 19. In this case, too, the maximum storable number of entries of the transmitted mail information in each of the cellular phones 3 may be a fixed value, or a variable value. Further, the maximum storable number may be the same number as the maximum storable number of entries of the cellular phone 3 that is defined in a specification of that corresponding cellular phone 3.

In addition to the above storage areas, the memory unit 7 has a telephone book information storage area for storing telephone book information that includes telephone numbers and registration names, an outbound call history information storage area for storing a call time and a call number of an outbound call operation from the hands-free apparatus 2 or from the cellular phone 3 that connects HFP to the hands-free apparatus 2, an inbound call history information storage area for storing a call time and a call number of an inbound call operation to the cellular phone 3 that connects HFP to the hands-free apparatus 2, and the like.

The signal input unit 10 inputs an accessory (ACC) signal from a key switch. If the ACC signal from the key switch is ON (i.e., in a high level), the control unit 4 turns on the in-vehicle hands-free apparatus 2 to a normal operation condition by supplying power for all function blocks from a battery (i.e., operated in an wakeup condition), and, if the ACC signal from the key switch is OFF (i.e., in a low level), the control unit 4 turns off the in-vehicle hands-free apparatus 2 to a low power consumption operation condition by supplying power only for a limited number of function blocks from the battery (i.e., operated in a sleep condition).

A display apparatus 16 includes a display unit 17 displaying various screens and a touch operation input unit 18 forming a touch switch on the screen. The display control unit 8 controls the display operation of the display unit 17 in the display apparatus 16 according to an instruction when the instruction is input from the control unit 4. The input control unit 9 outputs, to the control unit 4, an operation detection notice inputted from the touch operation input unit 18 according to an operation of the touch switch by the user, and the control unit 4 analyzes the operation detection notice inputted from the input control unit 9.

In the above configuration, the received mail storage area and the transmitted mail storage area in the memory unit 7 has volatile nature. Therefore, when the user gets off from the vehicle by turning the ignition key to an off position to shut the power supply for the vehicle device, resulting in a determination of ACC signal off by the control unit 4, the received mail information and the transferred mail information being stored in those storage areas immediately before the ACC signal off are deleted without maintaining the stored condition of the mail information.

Further, if the control unit 4 determines that, as an analysis result of the operation detection notice from the input control unit 9, the user operated the touch operation input unit 18 to display text or a title list of the mail information that is stored in the memory unit 7, the control unit 4 outputs an instruction notice according to the analysis result to the display control unit 8 to display the user specified text or the title list on the display apparatus 16.

The cellular phone 3 consists of a controller for controlling the entire cellular phone operation, a telephone communication unit for controlling telephone communication to the communication network 19, a BT interface unit for performing BT communication, a key input unit that has a key arrangement for the user operation, a memory unit having a received mail information storage, a transferred mail information storage, and a directory storage for respectively storing received mail information, transferred mail information, telephone directory information of e-mails exchanged with the communication network 19, a display unit for displaying various screens, a microphone for inputting user voice, and a speaker for outputting caller's voice received from a caller.

In this case, the BT interface unit of the cellular phone 3 has a function to perform BT communication with the in-vehicle hands-free apparatus 2, and, in that BT communication, simultaneous connections of HFP and MAP are enabled, just like the communication by the BT interface unit 5 of the in-vehicle, hands-free apparatus 2. In this case, the communication network 19 mentioned above includes well-known cellular phone service facilities such as a cellular phone station, a station control apparatus and the like.

Figure 3:
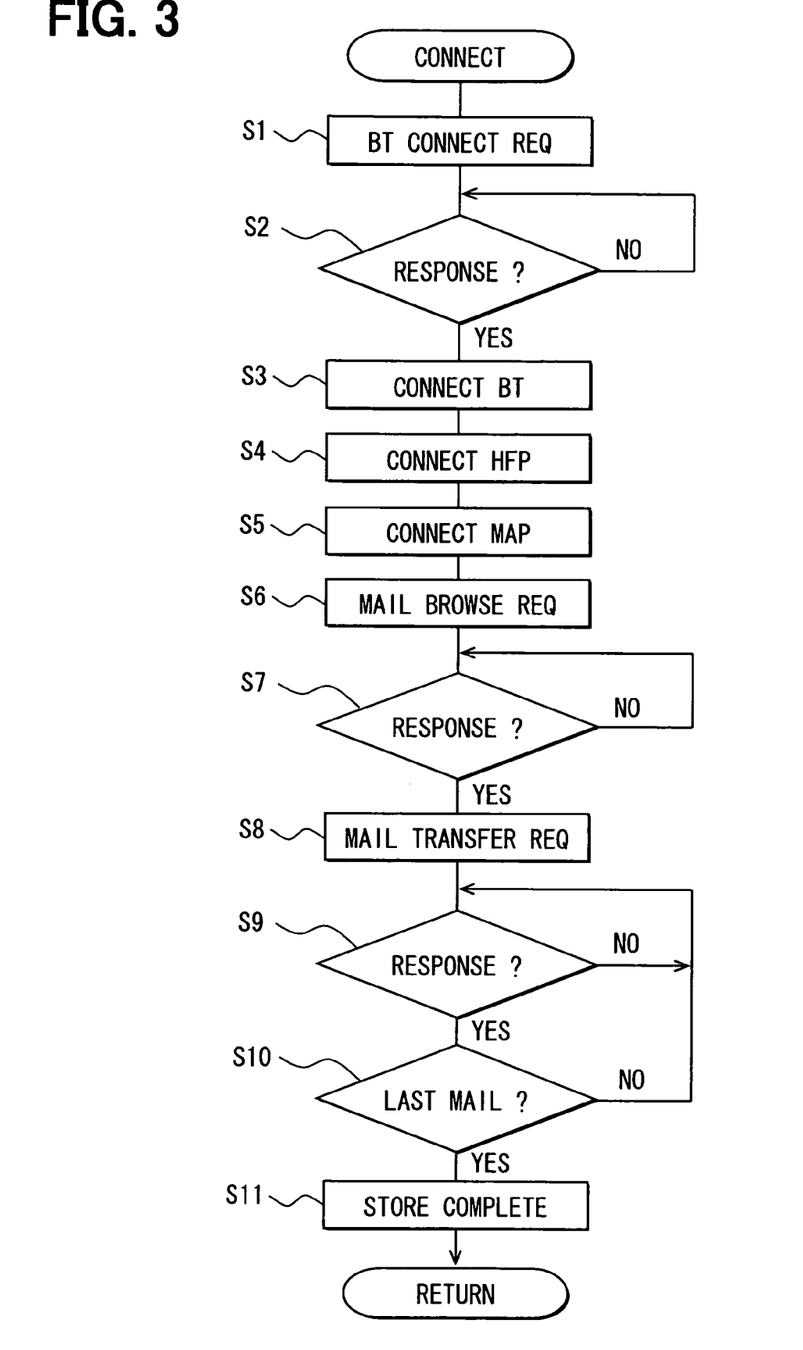
FIG. 3 is a flowchart of a process performed in the hands-free system.
Figure 4:
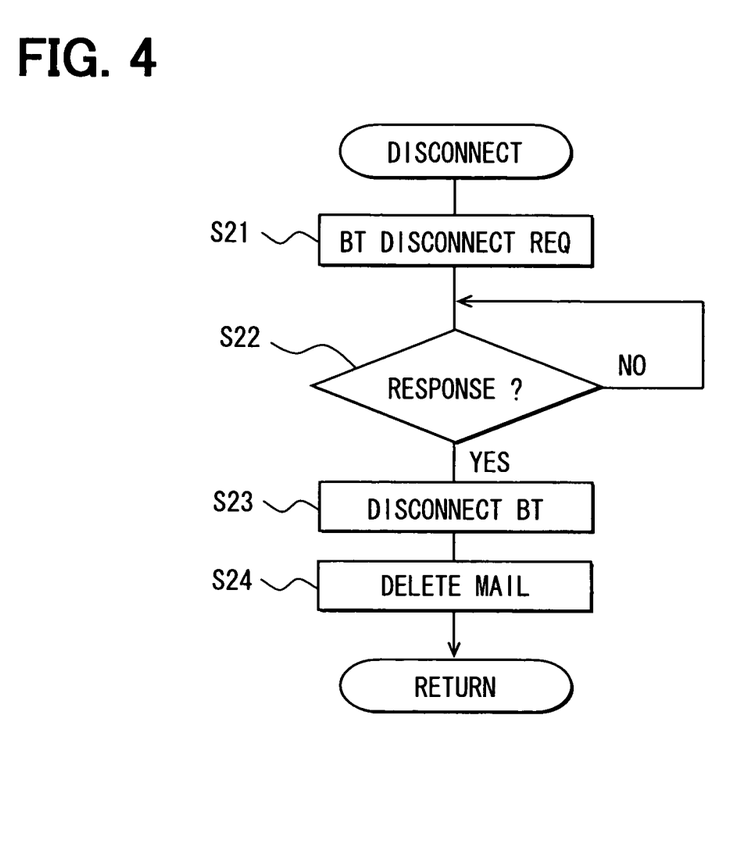
FIG. 4 is a flowchart of another process performed in the hands-free system.
Figure 5:
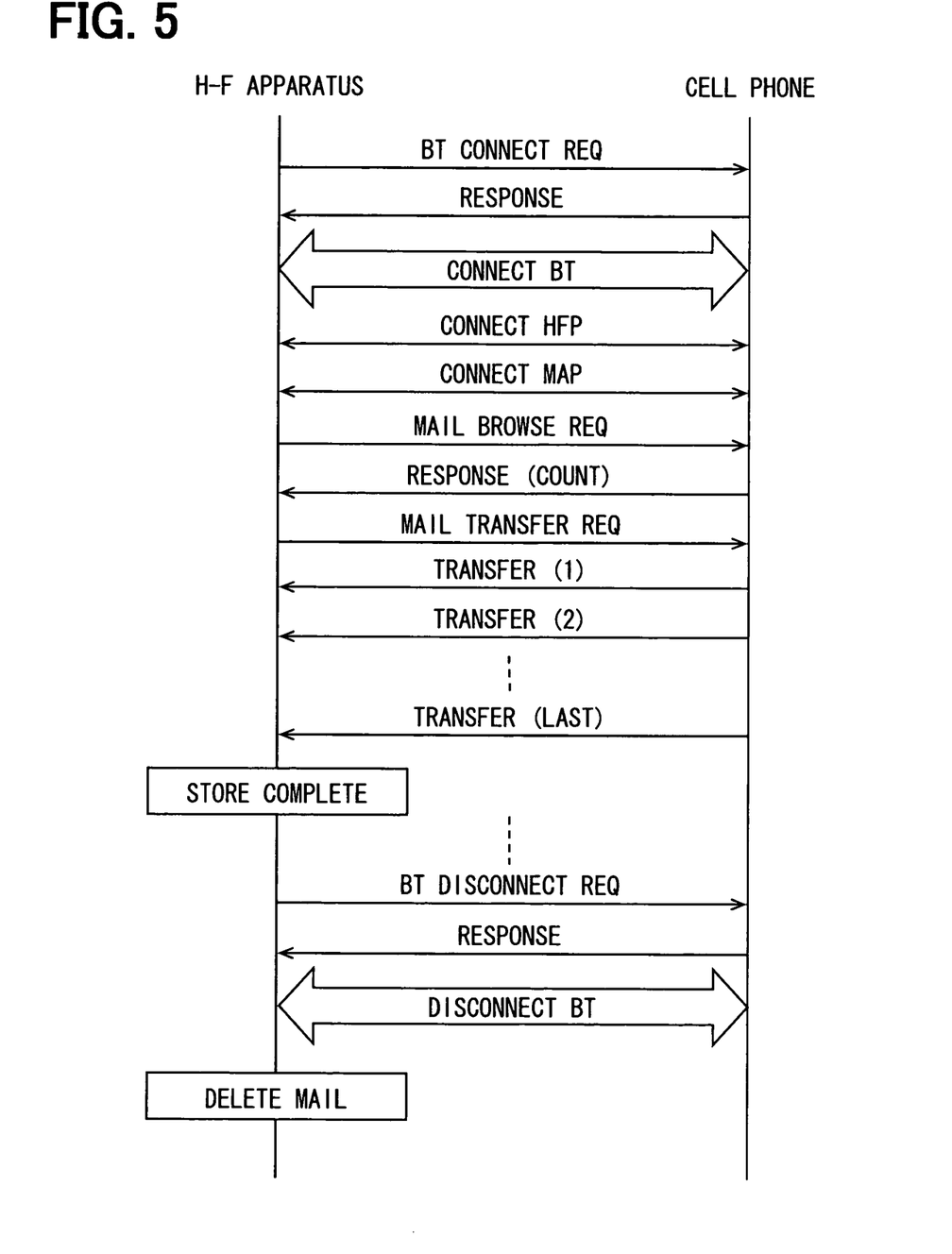
FIG. 5 is a sequence chart of an e-mail handling process in the hands-free system.

The operation according to the configuration described above is explained with reference to FIGS. 3 to 5. FIG. 3 shows a flowchart of a BT communication channel connection process that the in-vehicle hands-free apparatus 2 performs, and FIG. 4 shows a flowchart of a BT communication channel disconnection process that the in-vehicle hands-free apparatus 2 performs. FIG. 5 shows a sequence chart of an e-mail handling process that involves both of the cellular phone 3 and the in-vehicle hands-free apparatus 2. A situation described in the following is that, the received mail information stored in the cellular phone 3 is transferred from the cellular phone 3 to the in-vehicle hands-free apparatus 2, when the BT communication channel between the cellular phone 3 and the in-vehicle hands-free apparatus 2 is connected.

(1) BT Communication Channel Connection Process

The control unit 4 periodically monitors, in a main process, whether a connection request for connecting the BT communication channel to the cellular phone 3 has occurred. If the control unit 4 determines that the connection request has occurred, the control unit 4 starts a BT communication channel connection process as an interrupt processing in the main process, which is shown in FIG. 3.

When the control unit 4 starts BT communication channel connection process, it transfers a BT connection request to the cellular phone 3 from the BT interface unit 5 (step S1), and waits for a reception of a response to the request from the cellular phone 3 by the BT interface unit 5 (step S2). If determining YES at step S2, that is, when the control unit 4 determines that a response, to the BT connection request from the cellular phone 3, that includes, for example, identification information such as a BT address for the cellular phone 3 is received by the BT interface unit 5, the control unit 4 connects a BT communication channel between the BT interface unit 5 and the cellular phone 3 (step S3), and connects HFP to perform a hands-free call (step S4), and connects MAP to perform e-mail transfer (step S5). In this case, the control unit 4 distinguishes the cellular phone 3 as a connecting destination of the BT communication channel by analyzing the identification information included in the response to the BT connection request.

Subsequently, the control unit 4 transfers a received mail browse request to the cellular phone 3 from the BT interface unit 5 (step S6), and waits for a reception to the browse request by the BT interface unit 5 from the cellular phone 3 (step S7). When the cellular phone 3 receives the browse request from the hands-free apparatus 2, the cellular phone 3 refers at that moment to the received mail storage area in itself, and retrieves all entries of received mail information to transfer the information to the hands-free apparatus 2. That is, the count of the received e-mails is transferred, as a response to the request, to the hands-free apparatus 2 as shown in FIG. 5, and the information of each of the received e-mails is transferred one by one subsequently.

When the control unit 4 determines that the response to the received mail browse request is received by the BT interface unit 5 from the cellular phone 3 (step S7, YES), the control unit 4 stores the count of e-mails in the response, transfers a received mail transfer request to the cellular phone 3 from the BT interface unit 5 (step S8), and waits for a response to the transfer request received by the BT interface unit 5 from the cellular phone 3 (step S9). When the cellular phone 3 receives the received mail transfer request from the hands-free apparatus 2 in this manner, the response to the received mail transfer request including the contents of each one of the received e-mails stored in the received mail storage area is transferred. The response to the received mail transfer request including the contents of the received e-mail is transferred to the hands-free apparatus 2 in an order of reception date of the received e-mails, for example.

When the control unit 4 determines that the response including the received mail information of one e-mail is received from the cellular phone 3 by the BT interface unit 5 (step S9, YES), the control unit 4 stores the received mail information of the one e-mail in the received mail storage area of the memory unit 7, and determines if it is the response for the last e-mail to be transferred by comparing information on the number of e-mails with information of the order of the currently transferred e-mail (step S10).

When the control unit 4 determines that the transferred information is not the information for the last e-mail (step S10, NO), the process returns to step S9 to repeat the above process. If the control unit 4 determines that the transferred information is the information for the last e-mail (step S10, YES), the control unit 4 completes the store process for storing the mail information in the received mail storage unit (step S11), and concludes the BT communication channel connection process, to return to the main process.

In summary, the control unit 4 synchronizes the hands-free apparatus 2 with the cellular phone 3 just after connecting the BT communication channel to the cellular phone 3, in terms of the e-mails that are received by the cellular phone 3 while the BT communication channel is not connected between the hands-free apparatus 2 and the cellular phone 3. The synchronization is conducted by controlling the cellular phone 3 to transfer all entries of the e-mails in the received mail storage area in the cellular phone 3 to the hands-free apparatus 2 to be stored in the received mail storage area in the memory unit 7.

In this manner, after the synchronization, the user, for example, can display the text or can list the titles of the received e-mails that are received by the cellular phone 3 from the communication network 19 while the cellular phone 3 and the in-vehicle hands-free apparatus 2 are not connected by the BT communication channel, just by the operation of the touch operation input unit 18 of the in-vehicle hands-free apparatus 2.

In this case, for the transfer of the e-mails from the cellular phone 3 described to the in-vehicle hands-free apparatus 2, either the MAP or the HFP (i.e., a data transfer function of HFP) may be used.

(2) BT Communication Channel Disconnection Process

The control unit 4 periodically monitors, in a main process, whether a disconnection request for disconnecting the BT communication channel to the cellular phone 3 has occurred. If the control unit 4 determines that the disconnection request has occurred, the control unit 4 starts a BT communication channel disconnection process as an interrupt processing in the main process, which is shown in FIG. 4.

When the control unit 4 starts BT communication channel disconnection process, it transfers a BT disconnection request to the cellular phone 3 from the BT interface unit 5 (step S21), and waits for a reception of a response to the request from the cellular phone 3 by the BT interface unit 5 (step S22). If determining YES at step S22, the control unit 4 disconnects the BT communication channel between the BT interface unit 5 and the cellular phone 3 (step S23), and deletes all the e-mails stored at that point in the received mail storage area of the memory unit 7 (step S24), and concludes the BT communication channel disconnection process, and returns to the main process.

In other words, information of the all e-mails stored in the received mail storage area of the memory unit 7 just after the connection of the BT communication channel is deleted right after the disconnection of the BT communication channel between the BT interface unit 5 and the cellular phone 3.

In addition, if the control unit 4 detects that a new e-mail is received by the cellular phone 3 from the communication network 19 during the transfer of the received mail information from the cellular phone 3 to the in-vehicle hands-free apparatus, the transfer of the received mail information is started over again from the beginning after the completion of the e-mail reception by the cellular phone 3, so that the received mail information includes the newly received e-mail.

As the in-vehicle hands-free apparatus 2 is configured to receive the received mail information of all the e-mails received by the cellular phone 3 from the communication network 19 and stored in the cellular phone 3, right after the connection of the BT communication channel between the hands-free apparatus 2 and the cellular phone 3, the hands-free apparatus 2 synchronizes, with the cellular phone 3, the e-mails that are received by the cellular phone 3 from the network 19 during the disconnection time of the BT communication channel, and thus enables the user to handle the contents (i.e., text) of those "received-during-disconnection-time" e-mails on the hands-free apparatus 2. That is, the user's convenience is improved by the above operation scheme.

Further, because the in-vehicle hands-free apparatus 2 has a dedicated received mail storage area for each of the multiple cellular phones 3, the hands-free apparatus 2 can synchronize the "received-during-disconnection-time" e-mails with each of the multiple cellular phones 3.

Furthermore, the transferred and stored e-mails that are transferred right after the connection of the BT communication channel are deleted when the BT communication channel is disconnected. Therefore, the transferred mail information on the hands-free apparatus 2 is prevented from being left stored in the hands-free apparatus 2. That is, the malicious use of the e-mail contents transferred from the cellular phone 3 by the third person is prevented.

The advantageous effects of the present invention are clarified by the sequence chart in FIG. 5 that illustrates the operation of both sides of the mail information exchange as well as the exchanged information itself.

Although the present disclosure has been fully described in connection with preferred embodiment thereof with reference to the accompanying drawings, it is to be noted that various changes and modifications will become apparent to those skilled in the art.

For example, the mail handling apparatus having a short range wireless communication function may be a navigation apparatus or the like as long as it has a mail information handling function, not just the hands-free apparatus used in the vehicle. Further, the mail handling apparatus may be a portable apparatus that is carried by the user, or a fixedly-installed apparatus that is not carried by the user.

The information to be synchronized is not only the received (i.e., inbound) mail information but also outbound mail information. That is, outbound mail information transmitted from the cellular phone 3 to the network 19 during the BT communication channel disconnection time may be transferred from the cellular phone 3 to the hands-free apparatus 2. Further, both of the inbound and outbound mails may be synchronized between the cellular phone 3 and the hands-free apparatus 2 by transferring information of both of the inbound and outbound mails.

Furthermore, to include a newly transmitted e-mail that is transmitted from the cellular phone 3 to the network 19 during the information transfer from the cellular phone 3 to the hands-free apparatus 2, the information transfer from the cellular phone 3 to the hands-free apparatus 2 may be re-started from the beginning after the completion of the transmission of the newly transmitted e-mail from the cellular phone 3 to the network 19.

Such changes, modifications, and summarized schemes are to be understood as being within the scope of the present disclosure as defined by appended claims.

What is claimed is:

1. A mail handling apparatus comprising:
   a connection unit for connecting a short range wireless communication channel to a cellular phone that stores mail information of an e-mail exchanged with a communication network;
   a mail information reception unit for receiving the mail information from the cellular phone on a condition that the short range wireless communication channel is connected between the connection unit and the cellular phone;
   a mail information storage unit for storing the mail information received from the cellular phone that is connected to the connection unit through the short range wireless communication channel;

an operation reception unit for receiving a user operation regarding the mail information in the mail information storage unit; and a control unit for processing the stored mail information in the mail information storage unit according to the user operation received by the operation reception unit, wherein the control unit controls, at a time of connection of the connection unit to the cellular phone through the short range wireless communication channel, the mail reception unit to receive the mail information, which includes the mail information of the mail that was exchanged by the cellular phone with the communication network while the cellular phone was not connected to the connection unit through the short range wireless communication channel, and controls the mail information storage unit to store the mail information received by the mail information reception unit, and the control unit deletes the mail information received by the mail information reception unit and stored in the mail storage unit at a time of disconnection of the short range wireless communication channel between the connection unit and the cellular phone.

2. The mail handling apparatus of claim 1, wherein
the mail information storage unit has a plurality of storage areas for each of a plurality of cellular phones that are connectable to the connection unit through the short range wireless communication channel, and
the control unit identifies each of the plurality of cellular phones being connected to the connection unit through the short range wireless communication channel for storing the mail information received by the mail information reception unit in the storage areas of the corresponding cellular phones.

3. The mail handling apparatus of claim 1, wherein
the control unit transmits a request for mail information to the cellular phone without receiving a user request, when the short range wireless communication channel is established.

4. The mail handling apparatus of claim 1, wherein
the disconnection of the short range wireless communication channel is performed when the control unit transfers a short range wireless communication channel disconnection request to the cellular phone.

5. The mail handling apparatus of claim 4, wherein
after the disconnection of the short range wireless communication channel and based on an assumption that a power supply is kept turned on during such disconnection, the control unit determines whether a connection request for connecting the short range wireless communication channel to the cellular phone has occurred.

6. A method for handling e-mails by a mail handling apparatus comprising:
connecting a short range wireless communication channel to a cellular phone that stores mail information of an e-mail exchanged with a communication network;
receiving the mail information from the cellular phone on a condition that the short range wireless communication channel is connected between the mail handling apparatus and the cellular phone;
storing the mail information received from the cellular phone that is connected to the mail handling apparatus through the short range wireless communication channel;
receiving a user operation regarding the stored mail information;
processing the stored mail information according to the user operation;
deleting the mail information received and stored in the mail handling apparatus when the connection between the mail handling apparatus and the cellular phone through the short range wireless communication channel is disconnected, wherein
the mail information is received, for storage in the mail handling apparatus, by a connection to the cellular phone through the short range wireless communication channel, the mail information includes the mail information of e-mails that was exchanged by the cellular phone with the communication network while the cellular phone is not connected to the mail handling apparatus through the short range wireless communication channel.

7. The method of claim 6, wherein
the mail handling apparatus is capable of connecting to multiple cellular phones, and
the received mail information from each of the multiple cellular phones is stored in respectively different storage areas in the mail handling apparatus.

8. The method of claim 6, further comprising:
transmitting a request for mail information to the cellular phone without receiving a user request, when the short range wireless communication channel is established.

9. The method of claim 6, further comprising:
transferring a short range wireless communication disconnection request to the cellular phone for the disconnection of the short range wireless communication channel between the mail handling apparatus and the cellular phone.

10. The method of claim 9, further comprising:
determining whether a connection request for connecting the short range wireless communication channel to the cellular phone has occurred after the disconnection of the short range wireless communication channel and based on an assumption that a power supply is kept turned on during such disconnection.

11. A mail handling apparatus comprising:
a connection unit for connecting a short range wireless communication channel to a cellular phone that stores mail information of an e-mail exchanged with a communication network;
a mail information reception unit for receiving the mail information from the cellular phone on a condition that the short range wireless communication channel is connected between the connection unit and the cellular phone;
a mail information storage unit for storing the mail information received from the cellular phone that is connected to the connection unit through the short range wireless communication channel;
an operation reception unit for receiving a user operation regarding the mail information in the mail information storage unit; and
a control unit for processing the stored mail information in the mail information storage unit according to the user operation received by the operation reception unit, wherein
the control unit controls, at a time of connection of the connection unit to the cellular phone through the short range wireless communication channel, the mail reception unit to receive the mail information, which includes the mail information of the mail that was exchanged by the cellular phone with the communication network while the cellular phone was not connected to the connection unit through the short range wireless communication channel, and controls the mail information storage unit to store the mail information received by the mail information reception unit, and the control unit deletes the mail information received by the mail information reception unit and stored in the mail storage unit based on a disconnection of the short range wireless communication channel between the connection unit and the cellular phone.

12. The mail handling apparatus of claim 11, wherein the disconnection of the short range wireless communication channel is performed when the control unit transfers a short range wireless communication channel disconnection request to the cellular phone.

13. The mail handling apparatus of claim 12, wherein after the disconnection of the short range wireless communication channel and based on an assumption that a power supply is kept turned on during such disconnection, the control unit determines whether a connection request for connecting the short range wireless communication channel to the cellular phone has occurred.

14. A method for handling e-mails by a mail handling apparatus comprising:

connecting a short range wireless communication channel to a cellular phone that stores mail information of an e-mail exchanged with a communication network;

receiving the mail information from the cellular phone on a condition that the short range wireless communication channel is connected between the mail handling apparatus and the cellular phone;

storing the mail information received from the cellular phone that is connected to the mail handling apparatus through the short range wireless communication channel;

receiving a user operation regarding the stored mail information;

processing the stored mail information according to the user operation; and deleting the mail information received and stored in the mail handling apparatus based on a disconnection of a connection between the mail handling apparatus and the cellular phone through the short range wireless communication channel, wherein the mail information is received, for storage in the mail handling apparatus, by the connection to the cellular phone through the short range wireless communication channel, the mail information received includes the mail information of e-mails that was exchanged by the cellular phone with the communication network while the cellular phone is not connected to the mail handling apparatus through the short range wireless communication channel.

15. The method of claim 14, further comprising:

transferring a short range wireless communication disconnection request to the cellular phone for the disconnection of the short range wireless communication channel between the mail handling apparatus and the cellular phone.

16. The method of claim 15, further comprising:

determining whether a connection request for connecting the short range wireless communication channel to the cellular phone has occurred after the disconnection of the short range wireless communication channel and based on an assumption that a power supply is kept turned on during such disconnection.

17. A mail handling apparatus comprising:

a connection unit for connecting a short range wireless communication channel to a cellular phone that stores mail information of an e-mail exchanged with a communication network;

a mail information reception unit for receiving the mail information from the cellular phone on a condition that the short range wireless communication channel is connected between the connection unit and the cellular phone;

a mail information storage unit for storing the mail information received from the cellular phone that is connected to the connection unit through the short range wireless communication channel;

an operation reception unit for receiving a user operation regarding the mail information in the mail information storage unit; and a control unit for processing the stored mail information in the mail information storage unit according to the user operation received by the operation reception unit, wherein the control unit controls, based on a connection of the connection unit to the cellular phone through the short range wireless communication channel that has a communication protocol connected condition for enabling a hands-free call, the mail reception unit to receive the mail information by sending a mail transfer request to the cellular phone, the mail information includes the mail information of the mail that was exchanged by the cellular phone with the communication network while the cellular phone was not connected to the connection unit through the short range wireless communication channel, and controls the mail information storage unit to store the mail information received by the mail information reception unit.

18. The mail handling apparatus of claim 17, wherein the mail information received and stored in the mail handling apparatus is deleted therefrom, based on a disconnection of the connection between the mail handling apparatus and the cellular phone through the short range wireless communication channel.

19. The mail handling apparatus of claim 18, wherein the control unit performs the disconnection of the short range wireless communication channel when the control unit transfers a short range wireless communication channel disconnection request to the cellular phone.

20. The mail handling apparatus of claim 19, wherein after the disconnection of the short range wireless communication channel and based on an assumption that a power supply is kept turned on during such disconnection, the control unit determines whether a connection request for connecting the short range wireless communication channel to the cellular phone has occurred.

21. A method for handling e-mails by a mail handling apparatus comprising:

connecting a short range wireless communication channel to a cellular phone that stores mail information of an e-mail exchanged with a communication network;

receiving the mail information from the cellular phone on a condition that the short range wireless communication channel is connected between the mail handling apparatus and the cellular phone;

storing the mail information received from the cellular phone that is connected to the mail handling apparatus through the short range wireless communication channel;

receiving a user operation regarding the stored mail information; and processing the stored mail information according to the user operation, wherein the mail information is received, for storage in the mail handling apparatus, by sending a mail transfer request to the cellular phone based on a connection to the cellular phone through the short range wireless communication channel that has a communication protocol connected condition for enabling a hands-free call, the mail information received includes the mail information of e-mails that was exchanged by the cellular phone with the communication network while the cellular phone is not connected to the mail handling apparatus through the short range wireless communication channel.

22. The method of claim 21, wherein the mail information received and stored in the mail handling apparatus is deleted therefrom, when the connection between the mail handling apparatus and the cellular phone through the short range wireless communication channel is disconnected.

23. The method of claim 22, further comprising:

transferring a short range wireless communication disconnection request to the cellular phone for the disconnection of the short range wireless communication channel between the mail handling apparatus and the cellular phone.

24. The method of claim 23, further comprising:

determining whether a connection request for connecting the short range wireless communication channel to the cellular phone has occurred after the disconnection of the short range wireless communication channel and based on an assumption that a power supply is kept turned on during such disconnection.

\* \* \* \* \*